May 28, 1946.　　　　　D. BENSEL　　　　　2,401,131
METHOD OF PRESERVING FOOD PRODUCTS
Filed April 11, 1941　　　3 Sheets-Sheet 2

INVENTOR
DURYEA BENSEL

BY Ely & Frye
ATTORNEYS

May 28, 1946.   D. BENSEL   2,401,131
METHOD OF PRESERVING FOOD PRODUCTS
Filed April 11, 1941   3 Sheets-Sheet 3

INVENTOR
DURYEA BENSEL

BY   Ely & Frye

ATTORNEYS

Patented May 28, 1946

2,401,131

UNITED STATES PATENT OFFICE 2,401,131

METHOD OF PRESERVING FOOD PRODUCTS

Duryea Bensel, Los Angeles, Calif., assignor to Bensel-Brice Corporation, Los Angeles, Calif., a corporation of California Application April 11, 1941, Serial No. 388,125

2 Claims. (Cl. 99—182)

This invention relates to a method of preserving food products, and more particularly, to a method and apparatus for preserving food products which will permit the preserved food products to be maintained in a sterile condition within a suitable hermetically sealed package without subjecting the sealed package to bactericidal temperatures.

Heretofore, food products, such as vegetables, fruits, meats, fish, and the like, have been commonly preserved by packaging the food products in strong rigid containers, such as tin cans, glass jars, and the like, and then subjecting the sealed containers to prolonged cooking temperatures in retorts, and the like, to render the contents sterile. This well known process was not entirely satisfactory, since the tin cans or glass jars were heavy, bulky, and expensive, both as to original cost and subsequent shipping and handling costs. Further, the processing in these containers generally imparted a noticeable unnatural taste to the preserved food. Also, processing in these well known containers usually destroyed some, if not all, of the original vitamins and also often discolored the food products. Recently I invented a method of preserving food products in containers of flexible, impervious films, such as rubber hydrohalide, vinyl resin films, and the like. (See U. S. Patent No. 2,231,-791.) While this process substantially eliminated the many objections to food preserved in tin cans, it still required the sealed packages of food to be subjected to cooking, i. e., bactericidal, temperatures after the food had been hermetically sealed in the package of flexible, impervious material.

An object of this present invention is to eliminate the heretofore essential step of subjecting the package of food to bactericidal temperatures. Another object of this invention is to provide a process which will permit food products, such as vegetables, fruits, meats, and fish, to be preserved in light, inexpensive containers of impervious material transparent to ultra-violet radiations. These containers may be compactly arranged in shipping containers, thus permitting the packaged food to be shipped and handled economically.

Another object of this invention is to provide a process for preserving food which will not impart a foreign taste and which will substantially retain the natural taste of the food. A further object of this invention is to provide a process of preserving food which will minimize the destruction of vitamins and, in the case of foods containing fatty esters, restore and often increase the vitamins in the food product. A still further object of this invention is to provide a process of preserving food whereby the food may be packaged in an easily opened container.

Another and still further object of this invention is to provide apparatus, including pressure cookers, volumetric filling means, and sterilizers, by which this process may be performed.

Other and further objects and advantages of this invention will appear in the following specification, claims, and drawings, in which:

Figure 1:
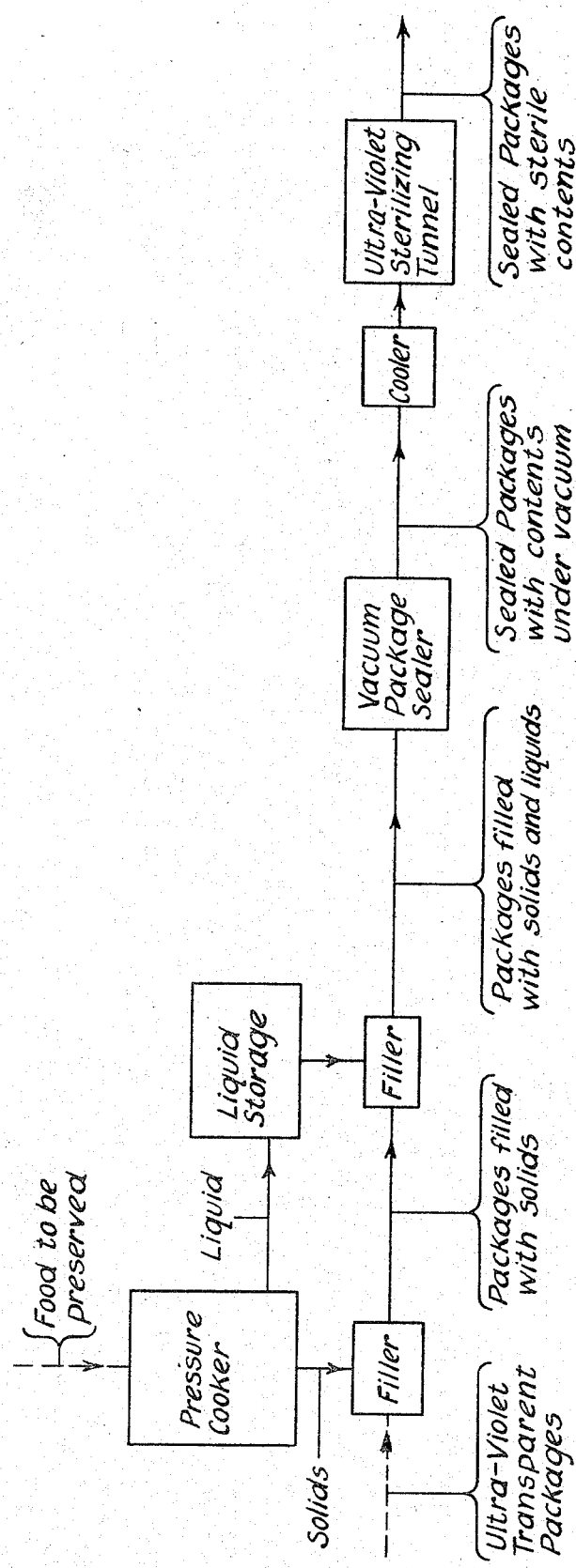
Fig. 1 represents a diagrammatic flow sheet illustrating the several steps in this process.

As is apparent from the foregoing statement of the objects of this invention and from Fig. 1 of the drawings, this invention is centered upon the use of light, inexpensive containers of material transparent to ultra-violet radiation and impervious to moisture, moisture vapor, and gases deleterious to food products and likely to be encountered in storing and handling the packaged preserved food. Such gases are, for example, oxygen ozone, ammonia, and sulphurous and halogenous gases. Such materials, hereinafter referred to as "transparent, impervious" materials, are, for example, rubber hydrohalide, such as the film known commercially as "Pliofilm," polyvinyl resin films, such as the vinyl chloride films known commercially as "Vinylite" or "Koroseal," polyamide films, such as the film known commercially as nylon, or films comprised of organic esters of cellulose or cellulose ethers. If such cellulosic sheets or films are not impervious, due primarily to their hygroscopic tendencies, they may be rendered impervious by a suitable bonded coating composition comprising a wax and/or a resin or by a coating composition having latex as a basic ingredient. Other suitable transparent, impervious materials may be impervious coated papers such as the coated paper product known commercially as "Diaphane" and comprising a paper, such as glassine, or, preferably, vegetable parchment, rendered impervious by a flexible, impregnating coating comprising a wax and/or a resin and a plasticizer. Any of these foregoing materials stated as examples may be actually opaque or only translucent to visible light, but since they are all readily transparent to ultra-violet light, they are "transparent" within the meaning of that term as used in this specification and in the claims. In addition to these essential characteristics of being impervious and transparent (to ultra-violet radiations), it is also desirable that the packaging material be flexible and heat-sealable, i. e., adjacent surfaces should be weldable under pressure and at a temperature in excess of the boiling point of water. Another desirable characteristic is that the composition of the packaging material should be stable and insoluble in water and food acids at temperatures at and below the boiling point of water. It is essential that the composition of the packaging material be substantially stable and insoluble in water and food acids at temperatures which may be encountered in handling and storing preserved food products, i. e., temperatures below 110° F. The foregoing materials, cited specifically as examples of suitable packaging materials, possess the necessary characteristics and most of the preferred characteristics. Other specific materials meeting these requirements may be known now and probably more will be developed as the art, and particularly the art relating to films of synthetic resins, advances.

According to one embodiment of this invention, as illustrated by the flow sheet on Fig. 1 of the drawings, the food product is prepared for pre-cooking. If the food to be preserved is a vegetable, for example, the vegetables are first thoroughly cleaned, cut to size, and blanched, if necessary, to set the color and albuminoids in the product. Blanching is usually accomplished by immersing the vegetables in water at 185° F. to 190° F. from three to five minutes and then removing the vegetables from the water and quickly cooling them to room temperature. Mold and wild yeast spores on the vegetables are usually rendered inert by blanching.

With the food suitably prepared for pre-cooking, a batch is placed in a pressure cooker 10, along with whatever brines, syrups, or sauces in which it is desired to cook and preserve the food, the types and amounts of liquid in which the food is cooked and preserved depending entirely upon the choice and discretion of the packer. After the food is placed in the pressure cooker, the pressure cooker is sealed and the food is processed at a temperature ranging from 212° F. to 255° F. until the food is thoroughly pre-cooked, the precise temperature and duration of the pre-cooking depending upon the particular food product being preserved. In the pre-cooking step, all organisms in the food are killed and unstable proteins and carbohydrates are stabilized. At the end of the pre-cooking period, the liquid, such as brine or syrup, may be drawn off to a liquid storage reservoir, where it is maintained at or near its boiling point until required. The pressure on the remaining solids in the pressure cooker is then reduced to normal and measured quantities of the solids are filled by a suitable volumetric filler into sterilized containers, normally bags or envelopes, of transparent, impervious material. Because of the batch operation necessitated by the preferred type of pressure cooker, the pressure cooker shown diagrammatically in Fig. 1 may actually consist of a battery of pressure cookers so that while one batch is being loaded from one cooker, other batches may be processed in other cookers.

Figure 2:
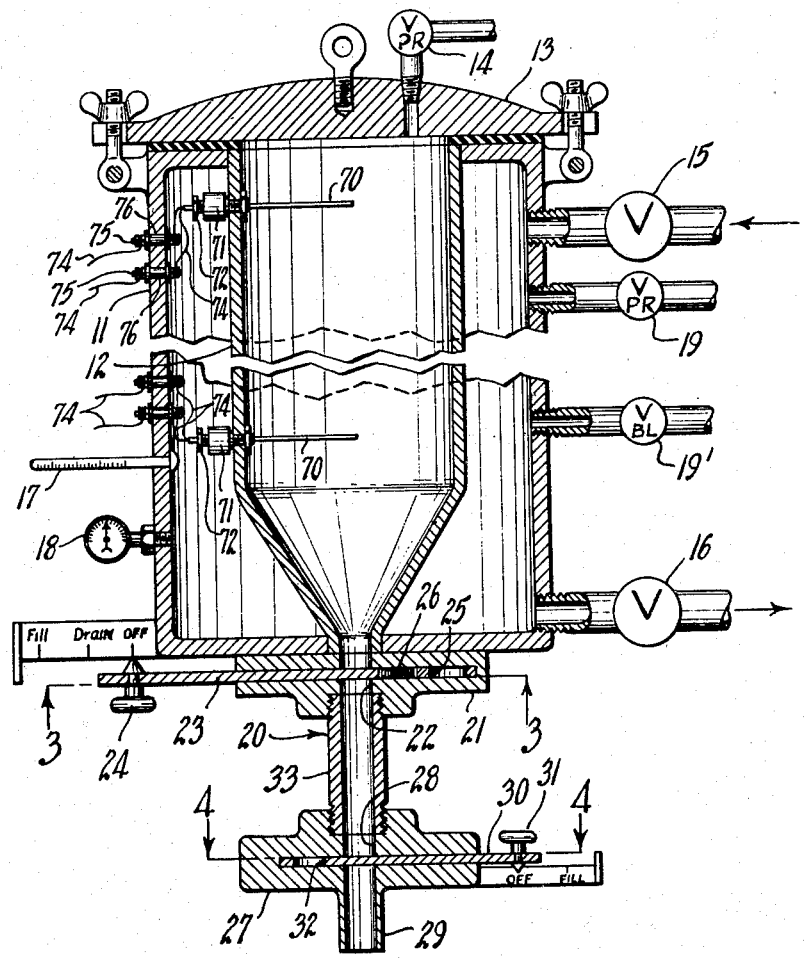
Fig. 2 is a cross-section of a pressure cooker and volumetric package filler which may be employed in this process.
Figure 7:
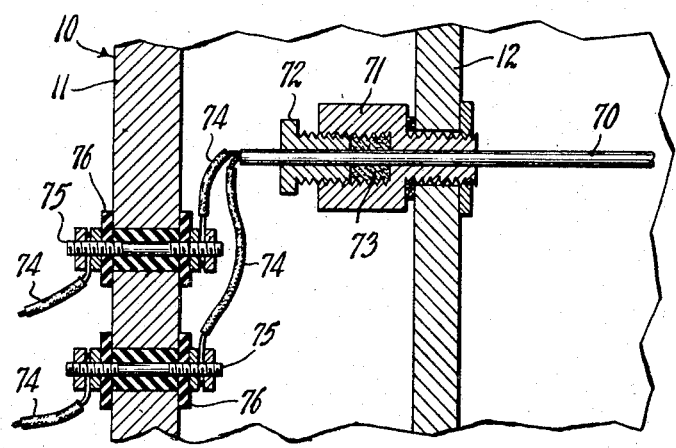
Fig. 7 is a fragmentary detail cross-section of a thermocouple installation taken from Fig. 1.

As shown in Fig. 2, a preferred embodiment of the pressure cooker 10 is comprised of an outer cylinder 11 and a concentric inner vat 12 for receiving the food, the closed-off volume between the cylinder 11 and vat 12 constituting a steam chamber for heating the vat 12. The vat 12, having an outlet connected to a volumetric filler 20, is sealed by the clamped lid 13 which may carry a suitable safety valve 14. Steam is admitted into the steam chamber by means of the inlet valve 15 and exhaust steam and condensate removed through the exhaust valve 16. The outer cylinder 11 may carry any suitable pressure and temperature controls and indicators such as the thermometer 17, pressure gauge 18, safety valve 19, and a bleeder valve 19' for precise control of the steam in the chamber. The vat 12 carries one or more thermocouples 70 which extend in toward the center of the vat. As shown in Fig. 7, each thermocouple 70 is slidably mounted in a journal 71 mounted in the wall of the vat 12. A threaded gland 72 and packing 73 seal the thermocouple 70 in the journal 71 and permit it to be secured in the desired adjusted position. Leads 74 connect the thermocouple to suitable registers and recorders (not shown), the leads 74 being taken through the cylinder wall 11 by means of the binding posts 75 insulated by the sleeves 76. Thus, by properly and suitably locating the thermocouples 70 at suitable key points in the vat 12 the actual processing temperatures of the food products within the vat may be known and controlled at all times.

Figure 3:
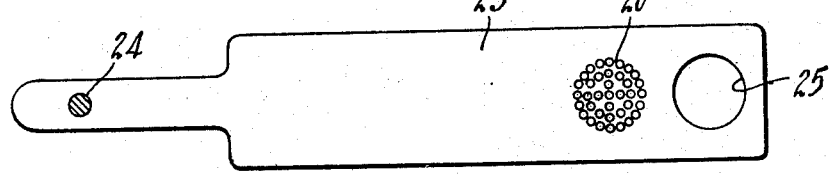
Fig. 3 is a detail plan view of a filling valve taken along the line 3—3 of Fig. 2.
Figure 4:
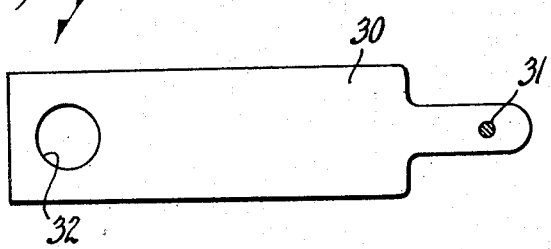
Fig. 4 is a detail plan view of an emptying valve taken along the line 4—4 of Fig. 2.

The volumetric filler 20 comprises an upper filling valve body 21, provided with a centrally located orifice 22 connected to the outlet of the vat 12. The upper valve body 21 is transversely recessed to receive the sliding valve plate 23 which extends across the orifice 22. As shown in Figs. 2 and 3, the valve plate 23 is provided with a handle 24 at one end and a filling port 25 adjacent the other. Adjacent the filling port 25 is the draining port 26 comprising a plurality of perforations in the valve plate 23. A lower emptying valve body 27 is likewise provided with an orifice 28 and an axially aligned thin-walled filling spout 29. The lower valve body is transversely recessed to receive the sliding valve plate 30 which extends across the orifice 28 and which is provided with a handle 31 at one end and an emptying port 32 adjacent the other. The orifices of the upper and lower valve bodies are connected by a tube 33. The tube 33 is threadedly, and therefore interchangeably, mounted in the valve bodies 21 and 27. As will be noted in Fig. 2, the diameters of the orifice 22, filling port 25, draining port 26, orifice 28, emptying port 32, and the bores of the tube 33 and spout 29 are all of approximately an equal diameter. Thus, the food products are less likely to be injured by the operation of the filler, and the volume discharged by the filler may be varied by simply interchanging tubes 33 of various lengths.

To operate the cooker 10 according to the process as described thus far, the prepared food is placed in the vat 12 and the lid 13 is clamped shut. Steam is then admitted to the steam chamber at the desired temperatures and pressures for the duration of the cooking period. Because the thermocouples 70 register the actual temperatures of the food products being processed, precise control of the cooking may be obtained by operation, manual or automatic, of the valves 15, 16, and 19'. Thus, it is possible with my apparatus to accurately determine, control, and even vary, if desired, the actual processing temperatures of the food itself during the cooking period. After the food is suitably cooked, the inlet valve 15 is shut and the steam in the chamber is bled off through the valve 19' to relieve the pressure in the vat 12. If necessary, water may be flooded into the steam chamber through the valve 15 to reduce the temperature and pressure in the vat 12 to any desired degree.

The volumetric filler 20 is then operated as follows: The valve plate 23 is set so that the drain port 26 registers with the orifice 22 and the valve plate 30 is set so that the port 22 registers with the orifice 28. Thus, the liquid in the batch in the vat 12 is drained off through the filler 20 and may be conveyed by any suitable means to a liquid storage reservoir (not shown except diagrammatically in Fig. 1). The valve plate 30 is then closed and the valve plate 23 is opened so that the port 25 registers with the orifice 22 and the tube 33 is filled with solids from the vat 12. While the tube 33 is being filled, an open transparent container, supported in a suitable form if desired, is positioned beneath the filling spout 29. The valve plate 23 is then closed and the valve plate 30 opened, emptying a measured volume of solids into the transparent impervious container. By alternately opening and closing the first filling valve plate 23 and then the emptying valve plate 30, measured volumes of solids are loaded into transparent, impervious containers until the batch is exhausted. Thereafter, the pre-cooked food in an adjacent cooker is loaded into subsequent bags while another batch is loaded and pre-cooked in the first cooker.

Following the filling of the transparent, impervious container with a measured volume of solids, the container is immediately conveyed to the liquid storage reservoir, where a suitable weight of liquid, maintained at the boiling point, is filled into the container so that the desired weight of contents is deposited in the container. Any suitable weight controlled filler, for example, may be employed at the liquid filling station.

With the desired weight of contents in the container, the filled but open container is next conveyed to a vacuum sealer. Although the steam arising from the heated contents will expell substantially all of the air within the container, a vacuum is drawn on the container at the time of sealing. The vacuum plus the increased boiling induced by the vacuum insures that all air is expelled from the container. Since the preferred transparent, impervious material of the container is flexible and heat-sealable, any suitable vacuum heat-sealer may be employed at this station.

From the filling and sealing stations the sealed containers are quickly cooled by passing them through a cooling canal. Such cooling canals are standard equipment in substantially all packing plants. By quickly cooling the packages, any tendency of the package to swell and rupture the seal under the pressure of its heated contents is prevented.

From the cooling canal the cooled, sealed packages pass through the sterilizing tunnel, where they are dried and thoroughly sterilized. Sterilization is accomplished by subjecting the contents of the packages to ultra-violet light to which the containers are transparent. Ultra-violet light having wave-lengths between 2,000 and 2,950 Angstrom units possesses rapid bactericidal powers. While the reason for the bactericidal property of ultra-violet light has not been definitely ascertained, it is believed that the ultra-violet light in the range of wave-lengths stated breaks down the internal cell walls of the bacteria, thus actually bursting the bacteria to destroy them. Regardless of the reasons for the bactericidal powers of ultra-violet light in the range stated, it has been found that this ultra-violet light positively and rapidly destroys mold and wild yeast spore, thermophilic organisms, "flat sour" organisms, and any other bacteria found in food products and capable of deteriorating or spoiling the food. At the present time there are available on the market gaseous discharge tubes in which approximately three-fourths of the radiant energy produced by the tubes is ultra-violet light having a wave length of substantially 2,500 Angstrom units. Of the balance of the ultra-violet radiations discharged by these tubes, only a negligible trace of radiation is of wave lengths of the ozone forming wave lengths below 2,000 Angstrom units. If any ozone at all is formed within the food by the irradiation, it will have an antiseptic rather than a toxic effect, since the ozone will dissociate during a very short storage period. The balance of radiant energy discharged by the tubes is largely made up of antirachitic radiations of a wave length between 2,950 and 3,300 Angstrom units and radiations of longer wave lengths including non-antirachitic radiations and visible light. The effect of the non-bactericidal but antirachitic radiations is to restore and, in some instances, increase the vitamin content of the packaged food, particularly in foods containing fatty esters. Because the duration of irradiation is short, usually not more than ten or fifteen minutes, the small amounts of bleaching and taste destroying radiations discharged by the tubes has no perceptible effect on the packaged food.

Figure 5:
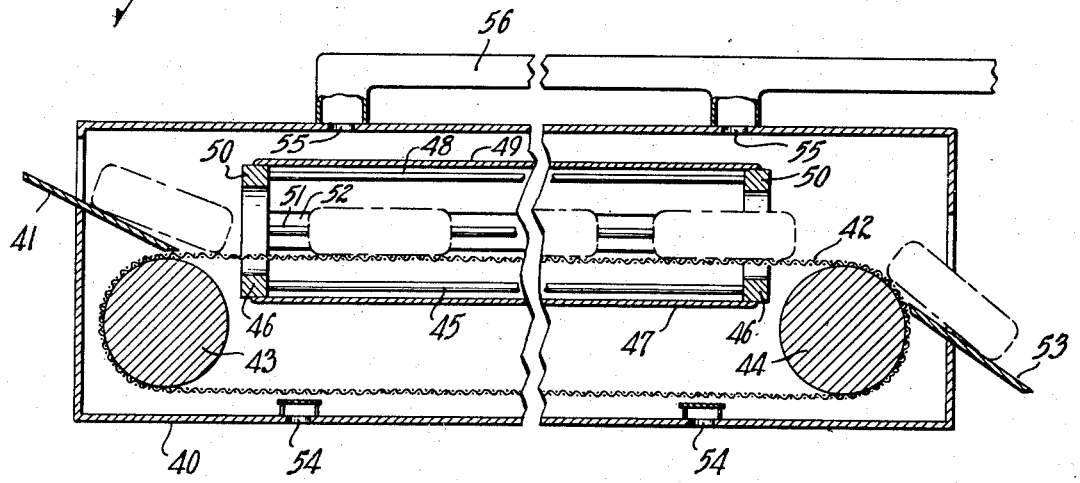
Fig. 5 is a cross-section of a sterilizing tunnel which may be used in this process.

The construction and operation of a preferred form of my sterilizing tunnel 40 is shown in Fig. 5. In the drawings, the tunnel 40 is provided with an entrance ramp 41, down which the sealed and cooled packages slide onto the conveyer 42 driven by the drums 43 and 44. The conveyer 42 may be of open wire mesh, as shown in the drawings, or an ultra-violet transparent belt or screen of plastic, such as cellulose acetate, for example. Although the conveyer 42 is shown as being a simple endless belt stretched between the drums 43 and 44, it is obvious that the conveyer may also be driven over the customary floating sheave to take up slack and that the belt may be agitated by any suitable means to agitate the contents of the conveyed packages. Beneath the belt and extending the length thereof are one or more ultra-violet discharge tubes 45 of the type described above. The tubes 45 are supported in the transverse socket bus bars 46, which also carry a reflector 47. Similar discharge tubes 48 and reflectors 49 are carried by transverse socket bus bars 50 suspended above the conveyer 42. Additional discharge tubes 51 and reflectors 52 are placed along the sides of the conveyer 42 so that all areas of the transparent impervious packages are subjected to the bactericidal ultra-violet rays of the discharge tubes, thus completely sterilizing the contents of the transparent, impervious packages by the time the packages are conveyed to the outlet ramp 53 of the tunnel 40. The tunnel 40 is also provided with ventilating inlets 54 and exhaust outlets 55 connected to the exhaust manifold 56. By so ventilating the tunnel 40, the heat generated by the several discharge tubes is conducted away and the packages, which are wetted in the cooling canal, are dried by the time they reach the outlet of the tunnel.

After the packages have passed through the outlet tunnel, they are ready for packing and shipment. Usually the transparent, impervious packages are placed in rigid carrier cartons of cardboard, or the like, in which the packages are sold retail. Such carrier containers protect the packages during shipment and handling and, being opaque to visible and ultra-violet light, protect the preserved food from the deleterious effects of ordinary sunlight. The complete packages, comprised of the inner transparent containers and outer carrier cartons, are usually rectangular in cross-section so that they may be compactly arranged in shipping cartons. Because the complete packages are light, a great economy is obtained in shipping space, weight and handling.

In the preferred embodiment of this invention described above, it is apparent that the contents of each package are thoroughly sterilized. The pre-cooked solids and the liquids are completely sterile at the time they are measured and filled into the previously sterilized containers. Thus, the only bacteria which could enter the packages prior to sealing would be air-borne bacteria which entered the packages at the time of filling and prior to sealing. Such air-borne bacteria, if not killed on contact with the boiling contents, are completely destroyed in the sterilizing tunnel. By pre-cooking the food in the pressure cookers, the flavor and taste of the food is affected as little as possible and a larger number of vitamins are retained than if the food were cooked in an open kettle. Also, all unstable proteins and carbohydrates are stabilized during the pre-cooking period. Thus, by later exhausting all air from the package prior to sealing, deterioration of the contents by chemical action, as well as by bacterial action, is prevented.

Figure 6:
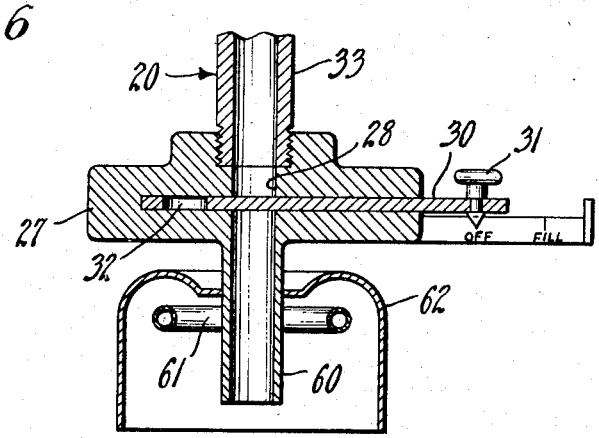
Fig. 6 is a fragmentary detail cross-section of a modified filling spout and sterilizer which may be used in this process.

It is apparent that this invention is not restricted to either the specific apparatus nor the exact procedure outlined in the preferred embodiment described above. For example, the procedure may be simplified by modifying the filler 20 as shown in Fig. 6. As in Fig. 6, the filling spout 20 may be replaced by an elongated spout 60 which carries a ring-shaped discharge tube 61 and downwardly directed reflector and hood 62. In the simplest procedure, both solids and liquid may be emptied into a previously sterilized transparent, impervious container placed over the mouth of the filling spout 60. Because of the sterilizing discharge tube 61, the outer surface of the spout 60 is absolutely sterile and all adjacent air is sterilized. As the food is filled into the open transparent, impervious container, the steam arising from the boiling food expels all air from the container. After the desired quantity of contents has been filled in the container, but before the mouth of the container has been completely removed from the spout 60, a pair of clamping and sealing jaws (not shown) seal the mouth of the container below the spout 60.

The filled and sealed packages, which have been subjected to the bactericidal radiations of the discharge tube 61 during the filling and sealing operations, are then quickly cooled. During the cooling operation, the steam evolved from the heated contents which fills the voids of the package condenses and creates a vacuum within the package. Although the packages thus filled, sealed and cooled are completely sterilized, at this stage, they may be then passed through the sterilizing tunnel to insure absolutely that the contents are thoroughly sterilized prior to packaging in carrier cartons for shipment.

If the food is packaged in sealed bags of the preferred transparent, impervious material, i. e., "Vinylite," "Koroseal," "Pliofilm," or similar films, the packages may be easily opened with a knife, or other sharp instrument, which will puncture the transparent, impervious material, thus eliminating the need for a can-opener. The packages may be opened either before or after the food has been reheated for serving.

From the foregoing, it is apparent that this invention is not limited, either in whole or in part, to the preferred embodiments disclosed, but may be modified and varied by those skilled in the art to the needs and requirements of the particular food products to be preserved. This invention, therefore, is limited to the scope of the following claims.

What is claimed is:

1. The process of preserving food products comprising the steps of pre-cooking the food products in pressure-cookers until the food products are substantially sterilized, filling the food products into transparent impervious containers, expelling air from the filled containers, hermetically sealing said containers, quickly cooling the filled and sealed packages of food, and subjecting the filled and sealed packages of food products to ultra-violet light having wave lengths ranging between 2,000 and 2,950 Angstrom units to sterilize the contents of said packages.

2. The process of preserving food products comprising the steps of pre-cooking the food in a liquid in a pressure-cooker at temperatures ranging between 200° and 250° F. until the food products are substantially sterilized, bleeding the pressure from the pressure-cooker after the food is pre-cooked, draining the liquid from the pre-cooker to a liquid storage reservoir and maintaining said liquid in said storage reservoir at substantially the boiling point of the liquid, filling measured volumes of the food solids remaining in the pressure-cooker into flexible, heat-sealable, transparent impervious containers, filling the stored liquid into the containers filled with solids, hermetically heat-sealing said containers, quickly cooling said filled and sealed packages, drying and subjecting said packages to ultra-violet light having wave-lengths between 2,000 and 2,950 Angstrom units, and placing said filled, sealed and sterilized packages in outer carrier cartons of cardboard.

DURYEA BENSEL.